(12) United States Patent  (10) Patent No.: US 8,594,842 B2
Abramson  (45) Date of Patent: Nov. 26, 2013

(54) LOCALISATION SYSTEM

(75) Inventor: Shai Abramson, Har-Halutz (IL)

(73) Assignee: F Robotics Acquisitions Ltd., Pardesiya (IL)

( * ) Notice: Subject to any disclaimer, the term of this patent is extended or adjusted under 35 U.S.C. 154(b) by 250 days.

(21) Appl. No.: 12/788,739

(22) Filed: May 27, 2010

(65) Prior Publication Data
US 2010/0305752 A1 Dec. 2, 2010

(30) Foreign Application Priority Data
May 28, 2009 (GB) .................................. 0909148.9

(51) Int. Cl.
G06F 19/00 (2011.01)

(52) U.S. Cl.
USPC ............. 700/245; 700/253; 700/258; 701/23; 318/567

(58) Field of Classification Search
USPC .............. 700/245, 253, 258; 701/23; 318/567
See application file for complete search history.

(56) References Cited

U.S. PATENT DOCUMENTS

| | | | |
|---|---|---|---|
| 5,045,860 A * | 9/1991 | Hodson | 342/451 |
| 6,338,013 B1 | 1/2002 | Ruffner | |
| 6,498,454 B1 | 12/2002 | Pinlam et al. | |
| 6,583,761 B1 * | 6/2003 | Angermeier et al. | 342/432 |
| 6,781,338 B2 * | 8/2004 | Jones et al. | 318/567 |
| 7,024,278 B2 | 4/2006 | Chiappetta et al. | |
| 7,567,052 B2 * | 7/2009 | Jones et al. | 318/587 |
| 7,579,803 B2 * | 8/2009 | Jones et al. | 318/567 |
| 7,610,687 B2 | 11/2009 | Stegmaier | |
| 7,630,792 B2 * | 12/2009 | Kim | 700/245 |
| 7,706,917 B1 * | 4/2010 | Chiappetta et al. | 700/245 |
| 2004/0111184 A1 * | 6/2004 | Chiappetta et al. | 700/245 |
| 2004/0210346 A1 | 10/2004 | Lee et al. | |
| 2005/0156562 A1 * | 7/2005 | Cohen et al. | 320/107 |
| 2005/0213082 A1 | 9/2005 | DiBernardo et al. | |
| 2006/0038521 A1 * | 2/2006 | Jones et al. | 318/567 |
| 2007/0042716 A1 * | 2/2007 | Goodall et al. | 455/67.11 |
| 2007/0050086 A1 | 3/2007 | Lim et al. | |
| 2007/0150109 A1 * | 6/2007 | Peless et al. | 700/245 |
| 2008/0097645 A1 * | 4/2008 | Abramson et al. | 700/258 |

FOREIGN PATENT DOCUMENTS

| | | |
|---|---|---|
| DE | 3107674 A1 | 9/1982 |
| DE | 19816785 A1 | 10/1999 |
| EP | 1302147 A1 | 4/2003 |
| EP | 1430826 A2 | 6/2004 |
| EP | 1677125 A1 | 7/2006 |
| FR | 2324047 A | 4/1977 |
| FR | 2584197 A1 | 1/1987 |
| FR | 2871894 A1 | 12/2005 |
| GB | 2278937 A | 12/1994 |
| JP | 2008225837 A | 9/2008 |
| WO | 20071067167 A1 | 6/2007 |

OTHER PUBLICATIONS

EPO Search Report of Jul. 22, 2009 (10 pages).

* cited by examiner

Primary Examiner — James Trammell
Assistant Examiner — Truc M Do
(74) Attorney, Agent, or Firm — Gerry J. Elman; Elman Technology Law, P.C.

(57) ABSTRACT

A robotic system comprises a transmitter emitting a plurality of angularly-spaced beams of radiation in an area; and a robot moving within said area and able to detect when it is in the path of one of said beams. On moving through a measured distance across the paths of two or more of the beams, the robot can determine the relative position of the transmitter and the robot by using the distance and the angular spacing of the beams.

10 Claims, 7 Drawing Sheets

LOCALISATION SYSTEM

RELATED APPLICATIONS

This application is relates to and claim priority from commonly owned UK Patent Application Number 0909148.9, filed May 28, 2009, the disclosure of which is incorporated by reference herein.

TECHNICAL FIELD

The invention relates to the positioning or localisation (also spelled localization) of a robot.

BACKGROUND OF THE INVENTION

Localization is an important and enabling technology in many fields, and in particular in the field of robotics and especially home robotics. In home robotics, the movement of a robot in relation to the domestic environment can be a particular challenge. A robot with the ability to locate itself can work much more efficiently in tasks of area coverage (where the commonly used random methods can have a practical efficiency of about 20% of maximum possible efficiency) and point to point navigation.

Currently available localization systems are either expensive (for example scanning lasers with corner reflectors, differential GPS or inertial system), do not have adequate accuracy or require cumbersome installation. Indeed, it is particularly undesirable that a robot—whose essential purpose is labour reduction—should require a lengthy and involved setup procedure to be carried out by the user.

Examples described herein can provide a low-cost localization system which preferably can be used both outdoor and indoor and require a minimum installation. In preferred examples, the accuracy of the system can be scalable (depending on the number of transmitters).

U.S. Pat. No. 7,079,923 (Robotic Vacuum Cleaner) and U.S. Pat. No. 7,196,487 (Method and System for Robot Localization and Confinement) describe low-cost virtual wall systems for defining boundaries or area sections by means of infrared beams. However these are not used to define robot exact location but rather the boundaries of the work area.

U.S. Pat. No. 7,024,278/U.S. Pat. No. 7,188,000 (Navigation Control System for a Robotic Device) describes a localization system based on a robot sending directional beams which are received by a stationary receiver. The beams are transmitted sequentially one after the other, and are being identified through their timing from the synchronization pulse or through a different pulse width each one can be transmitted. The stationary receiver estimates the angle to the robot and the distance (roughly, by the amplitude of the received signal) and transmit those back to the robot (the data can be transmitted for further robot analysis or can be interpreted by the controller of the receiver to create a navigation command to be transmitted to the robot). The patent further describes a similar method using the stationary unit as the angular transmitter and receiving and interpreting the signals at the robot.

There are several major drawbacks to such a system:
  If the beam transmitter is on the robot, there is a need for a communication link between the stationary receiver and the robot, in order to either send information regarding the location to the robot or send commands to the robot as to how to behave based on its location.
  The system requires a synchronization pulse to identify the transmitting beam. This may either involve an additional system (external sync, though, for example an omni-directional infrared which is hard to implement at longer ranges), or, the use of all directional transmitters together (which is not possible in a mechanically scanning beam—an implementation which can improve accuracy/cost).
  The distance estimation relies on amplitude therefore is very rough and may require calibration.

Aspects of the present invention seek to solve or at least mitigate one or more of these and/or other problems in existing localisation systems.

SUMMARY OF THE INVENTION

The following disclosure describes several aspects of a localization system:
  A method of encoding angular beams over an area without a need for synchronization
  A low cost mechanically scanning beam transmitter
  Localization calculation methods not requiring calibrations or initial settings.
  Extensions of the systems to include accurate distance measuring.
  Methods of efficient area coverage scanning based on the localization system.
  Methods of using key-points derived from the localization system on the perimeter of a designated area.
  Using multiple systems for increasing accuracy and coverage.

It will be understood that features of the aspects described may be provided independently or in any appropriate combination in an example of a localisation system.

Accordingly, in a first aspect of the invention, there is provided a robotic system comprising: a beam transmitter operable to emit a plurality of angularly-spaced beams of radiation in an area; and a robot operable to move within said area and to detect when it is in the path of one of said beams; wherein said robot is further operable, upon moving through a distance across the paths of two or more of said beams, to determine the relative position of said transmitter and said robot by using information relating to said distance and information relating to the spacing of said beams.

Preferably, the robot utilises (also spelled utilizes) the distance traveled between crossing the paths of two different beams to determine the position of said transmitter. Optionally, the point at which a beam is crossed may be defined as the point at which the signal received from that beam is at a maximum.

Preferably, the system further comprises a data transmitter operable to transmit data relating to each of the beams of the array and preferably wherein the system is adapted to emit said data between the transmitting of the beams of radiation. Optionally, the beam transmitter is operable to encode data relating to the beams within the beam signal itself. Alternatively, the beam transmitter may transmit data relating to the beams during periods when it is not transmitting the beams, for example alternating between transmitting a beam and transmitting data relating to that beam.

Preferably, the robot comprises an odometer. Such an odometer may assist the robot in determining the distance traveled between crossing different beams.

According to a second aspect of the present invention, there is provided a robotic system operable to indicate, to a robot operable to move within an area, a location adjacent the boundary of said area, the system comprising:
a transmitter, operable firstly to transmit a plurality of angularly-spaced beams of radiation into the area and operable secondly to transmit data including information regarding each beam transmitted into the area; and a robot operable to identify the intersection of a beam with the boundary of the area and further operable to use said data to identify said location.

Preferably, the robot is provided with a first receiver for detecting when it is adjacent to said boundary and a second receiver for detecting when it is in the path of one of said beams. These two receivers are preferably adapted to receive different types of signals, for example signals in different portions of the EM-spectrum. Optionally, the two receivers are adapted to receive signals in non-overlapping portions of the EM-spectrum. More preferably still, the first receiver is operable to receive radio-frequency signals, and/or the second receiver is operable to receive infra-red signals.

Preferably, the system further comprises a wire demarcating said boundary; more preferably still, the wire is arranged such that it produces a radio-frequency signal. Accordingly, said second receiver may be adapted to receive this radio-frequency signal.

Exemplary constructions disclosed herein provide a method of determining information relating to the position of an element, the method including the steps of: emitting a plurality of beams of radiation in an area, the beams being emitted by transmitting means and being separated by an angle of θ; moving the object through the area, and determining information relating to a distance moved by the object; determining information relating to the position of the object relative to at least two beams; and determining positional information regarding an element.

The system may include more than one transmitting element. The determination of the positional information may include making an estimate of the position of the transmitting element.

The distance moved by the object may be determined for example by using an odometer, for example by counting the number of turns of a drive wheel of the object, or by any other appropriate method. The use of an odometer is a low cost option in some applications, and in many examples will give sufficiently accurate results, in particular over short distances. The distance measuring preferably is used to determine information regarding the distance between the beams.

By knowing the angle of the at least two beams and the distance between them, the location of the transmitter can be estimated. For example, where the object crosses the beams, knowing the angle of the at least two beams crossed and the distance between the points of intersection, the location of the transmitter can be estimated.

The information regarding the location of the transmitter can later be used in the determination of positional information relating to the object.

Thus the element for which the positional information is determined may be a transmitting element (which may or may not be within the area), and/or the object itself.

Determining positional information regarding an element, may include determining positional information relating to the transmitting means.

The method may include the step of moving the object such that the object crosses at least two beams of the plurality of beams, the method further including determining information regarding the distance between the positions of the at least two points of crossing, and using the distance between the crossing points and information relating to the angle θ, determining information regarding the position of the transmitting means.

The method may include the step of moving the object through the area, and determining positional information regarding the object using the positional information regarding the transmitting means.

In this way, the position of the object, for example robot, can be determined using angular information, for example without a pre-knowledge about the location of the transmitter.

Still further exemplary constructions disclosed herein provide a method of localisation using a polar system of positioning. Preferably a plurality of beams at an angle of θ are emitted into the area, and information regarding the position of an object in the area is determined using angular and distance information, for example the distance from a transmitter from which the beams are emitted at the angle of θ, and information regarding the beam relative to the object. The information regarding the beam may for example include information identifying the beam and thus information as to the location of the beam in the area. Alternatively or in addition, the information regarding the beam may be obtained by the object moving through the area and interacting with or identifying one or more beams.

The method may include determining information regarding the position of an object relative to a reference point, the method including the steps of: transmitting a reference signal to the object or from the object; transmitting pressure wave between the reference point and the object the time of transmission of the pressure wave being in dependence on the transmission of the reference signal, receiving the reference signal and the pressure wave; and determining a time interval between the receipt of the reference signal and the pressure wave and using the determined time interval to determine information regarding the position of the object relative to the reference point.

The reference signal may include identifying data for the signal. Thus the signal may be coded. The signal may be a beam, as described herein.

Still further exemplary constructions disclosed herein provide a method of defining a location in an area, the area having a perimeter, the method including the steps of: transmitting a plurality of beams of radiation into the area: transmitting data including information regarding a beam transmitted into the area: identifying the intersection of a beam with the perimeter of the area and using the transmitted data to define a location in the area in the region of the intersection.

The location in the area may be for example a key point used in the movement of an object for example a robot in the area. The areas of intersection between the identified beam and the perimeter and define for example important locations in the area, for example can highlight a route to the charging unit, entry points, locations where speed needs to be adjusted, and other possibilities. In the examples given, the locations are defined at the perimeter of the area, although it will be apparent that other arrangements are possible. For example, the intersection of the beam with another landmark could be used in the definition of the location. The area may have an "internal perimeter" or obstacle having a defined location.

In some examples, as an object for example a robot moves through the region, the defined locations can be identified by a method including analysis of the data including information regarding the beams.

Preferably the defined location includes a region of intersection of a plurality of beams with the perimeter.

The invention also provides apparatus for defining a location in an area, the area having a perimeter, the apparatus including: means for transmitting a plurality of beams of radiation into the area, means for providing data including information regarding a beam transmitted into the area, means for identifying the intersection of a beam with the perimeter of the area and using the data to define a location in the area in the region of the intersection.

The means for transmitting may include a plurality of transmitting elements.

The elements may be in the same or similar location, or in a different location. The elements may be located in the area.

The perimeter or boundary may preferably be demarcated with a wire. More preferably still, the wire may carry an alternating voltage signal that produces a radio-frequency signal. Still more preferably, the robot is able to detect, by means of a receiver, this radiofrequency signal so as to identify when it is adjacent the boundary or perimeter of the area.

The transmitting element may be located at a charging station for a robot.

Exemplary constructions disclosed herein provide a system for use in the localisation of an object in an area, the system including: a transmitter for transmitting a beam of radiation into the area; and means for emitting data relating to the beam of radiation.

Preferably the system further includes means for moving the beam of radiation in the area. The radiation beam may be moved during the emission of radiation, or between the radiation emissions. The beam may comprise a rotating beam of radiation. The data may be emitted during the emission of the radiation, and/or at different times.

Preferably the system further includes means for transmitting an array of beams of radiation into the area.

Preferably the system further includes means for emitting data relating to each of the beams of the array.

Preferably the system further includes means for sequentially emitting the beams of the array, the emission of data relating to a beam being associated with the emission of that beam.

The data may include information relating to one or more of an identifier, a radiation source, an emission sequence.

Further exemplary constructions disclosed herein provide a method for use in localisation of an object in an area, the method including emitting a beam of radiation into the area and further including emitting data relating to the beam of radiation into the area.

The data may be a part of the emission with the beam of radiation or may be separate.

Still further exemplary constructions disclosed herein provide a system for use in the localisation of a robot in an area, the system including: means for transmitting an array of beams of radiation into the area, wherein each of the beams includes data, the data of a first beam being different from data of a second beam.

In some embodiments, one or more of the beams may be coded.

The beam shape may be any appropriate shape for the relevant application of the system. The means for transmitting the array may include one or more transmitters.

The array may include a plurality of substantially radially spaced apart beams.

The transmitter may be adapted to transmit an array of beams of radiation, the beams of the array being spaced apart by an angle $\theta$ from an adjacent beam.

In some arrangements, the beams of the array will be substantially equally spaced from each other, but other arrangements are possible.

The transmitter may include a transmitting element which is movable.

In this way the array can be provided using a small number, or one transmitting element.

The transmitter may include a rotatable element.

The transmitter may include a plurality of transmitting elements.

The system will generally include an array of transmitting elements. The elements may be arranged in a horizontal and/or vertical array.

In preferred arrangements, the elements are closely spaced. In some cases it is beneficial for the transmitter to provide a small or point source for the radiation.

The plurality of transmitting elements may be angularly spaced from each other.

Where the transmitter includes a plurality of transmitting elements, the elements may all emit radiation at the same time, and/or at different times.

The transmitting elements may include light emitting diodes (LED).

The transmitter may be adapted to emit a plurality of beams of radiation each subtending an angle of $\theta$ at the transmitter.

Preferably the angular width of the beam is $\theta$ where $\theta$ is approximately R/W where R is the radius of the area from the transmitter, and W is the localisation resolution required.

The transmitter may include a transmitter element including a radiation source and a radiation output device, the radiation output device being moveable.

For example the output device may include a rotatable mirror.

The transmitter may include means for transmitting infrared radiation into the area.

Other frequency radiation could be used as appropriate. A combination of different frequency radiation could be used in some examples.

The system may further include means for emitting data relating to one or more of the beams of radiation.

The system may be adapted to emit the data between the transmitting of the beams of radiation.

Further exemplary constructions disclosed herein provide a transmitter for use in a system described herein.

Still further exemplary constructions disclosed herein provide a method for use in the localisation of a robot in an area, the method including transmitting an array of beams of radiation into the area.

Still further exemplary constructions disclosed herein provide a method for movement of an object in an area, the area having a perimeter, the method including: transmitting a plurality of beams of radiation into the area; locating the object in the area; identifying a beam of radiation adjacent the object; moving the object along the beam.

The method may include moving the object along the beam, detecting that the object is adjacent the perimeter; moving the object along the perimeter until a further beam is detected, moving the object along the further beam.

The method may include providing a transmitter for transmitting the plurality of beams of radiation, the transmitter being located outside the area. The method may include providing a plurality of transmitters. The method may include transmitting data regarding a beam of the plurality of beams. The data may be transmitted during the transmission of the beam.

The method may include the step of determining information regarding the distance of the object from a transmitter transmitting the beams of radiation and selecting the beam to travel along in dependence on the determined distance information.

The method may include the step of following alternate beams if the determined distance is below a predetermined threshold.

The method may include providing a plurality of spaced apart transmitters, each transmitting a plurality of beams of radiation, the method including transmitting radiation from first and second transmitters such that a first beam from the first transmitter intersects a second beam of a second transmitter, identifying that the robot is at the first beam, and causing the robot to follow the first beam, identifying that the robot is at the intersection between the first and second beams and causing the robot to move from the first beam and to follow the second beam.

The method may include the step of determining information regarding the intersection of the beams with other beams and/or the perimeter. Such determination can be carried out before and/or during the movement of the object or robot in the area.

The method may include the step of estimating the position of one or more transmitters and/or obstacles.

Preferably a control system is provided to control the movement of the robot or other object in dependence on the detected beams, data and/or other information.

The invention also provides apparatus for carrying out any method described.

Various parts or elements of the apparatus may be provided independently and may be located together or separately in the system. For example, control and processing apparatus may be provided separately or together with one or more transmitters. Some of the elements may be provided on the robot or any charging station.

Still further exemplary constructions described hereinafter provide a method of determining information regarding the position of an object relative to a reference point, the method including the steps of: transmitting a reference signal to the object or from the object; transmitting a pressure wave between the reference point and the object the time of transmission of the pressure wave being in dependence on the transmission of the reference signal, receiving the reference signal and the pressure wave; and determining a time interval between the receipt of the reference signal and the pressure wave and using the determined time interval to determine information regarding the position of the object relative to the reference point.

Preferably the reference point is the transmitter/receiver of the pressure wave.

The term transmitter/receiver should preferably be interpreted broadly to include any apparatus which is adapted to transmit and/or receive signals. The transmission and/or reception of signals may be carried out by the object (for example the robot) and/or other element or apparatus. This may be for example a part of a charging device for the robot or a separate apparatus in the system.

It will be appreciated that various combinations and arrangements are possible.

The reference signal may include a high speed wave, for example an electromagnetic wave. The pressure wave may include a relatively low speed wave, for example an ultrasonic wave.

Still further exemplary constructions disclosed herein provide a method of determining information regarding the position of an object relative to a reference point, the method including the steps of: transmitting first and second signals, the first and second signals including first and second identification data, respectively; transmitting a pressure wave between the reference point and the object the time of transmission of the pressure wave being in dependence on the transmission of the first signal, receiving the pressure wave and the second signal; and determining a time interval between the receipt of the pressure wave, the first signal and/or the second signal, and using the determined time interval to determine information regarding the position of the object relative to the reference point.

In examples the time of flight determination depends on the time interval determined between the pressure wave and the second signal and the time between the first and second signals.

Preferably the first and/or second signals are coded, for example, include identification data, and the time between the first and second signals can be determined using the data.

Preferably the first and/or second signals include an electromagnetic wave

Preferably the first and second signals include for example visible, infrared, RF and/or microwave radiation.

The first transmitted signal may include a multi-directional signal.

In preferred examples, the signal is substantially omni-directional, and is emitted in substantially all directions in a horizontal plane. Preferably the signals are transmitted at intervals allowing the pressure wave to propagate the maximum distance required.

Preferably the pressure wave includes an ultrasound and/or a sound wave.

In examples, the signal which triggers the emission of the pressure wave may reach the object (or other position), significantly later than the time the pressure wave was transmitted. By coding the beams using the identification data, the time from transmission to receiving can be calculated. For example, if it is known that the triggering beam number is N, and at the object position a beam number M is received and after time T the pressure wave was received. Then the pressure wave traveled for (M−N)dT+T time (dT being the time period between consecutive beams).

The signals may be received at the object.

Preferably the reference point is the transmitter means, preferably which is arranged to transmit the first and second signals and/or the pressure wave.

The object may include a robot.

The determination of the position may be carried out for example in a processing device located on the robot (or other object), at the transmitter/receiver and/or elsewhere, for example at a control device in the system.

The reference signal and the pressure wave may be transmitted from the reference point.

The transmission of the second signal and the pressure wave may be synchronised.

The transmission of the second signal may be made in dependence on the reception of the first signal.

For example the first signal may be transmitted from a source different from that of the pressure wave and/or the second signal, the pressure wave being transmitted in dependence on reception of the reference signal at the pressure wave transmitter.

The pressure wave may include a pulse, preferably the pulse being synchronised with a part of the first signal.

The pressure wave may include a plurality of pulses, the frequency of transmission of the pulses being such that a pulse has been received at the object or other receiver before the transmission of the subsequent pulse.

The first and/or second signal may include an infrared signal.

The first and/or second signal may include data relating to the position of the signal in an area.

The determination of information relating to the position of the object may use the data included in the first and/or second signal.

The invention also provides apparatus for carrying out any of the methods described.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of aspects of the present invention will now be described, purely by way of example, with reference to the accompanying drawings, in which.

DETAILED DESCRIPTION OF EMBODIMENTS

Figure 1:
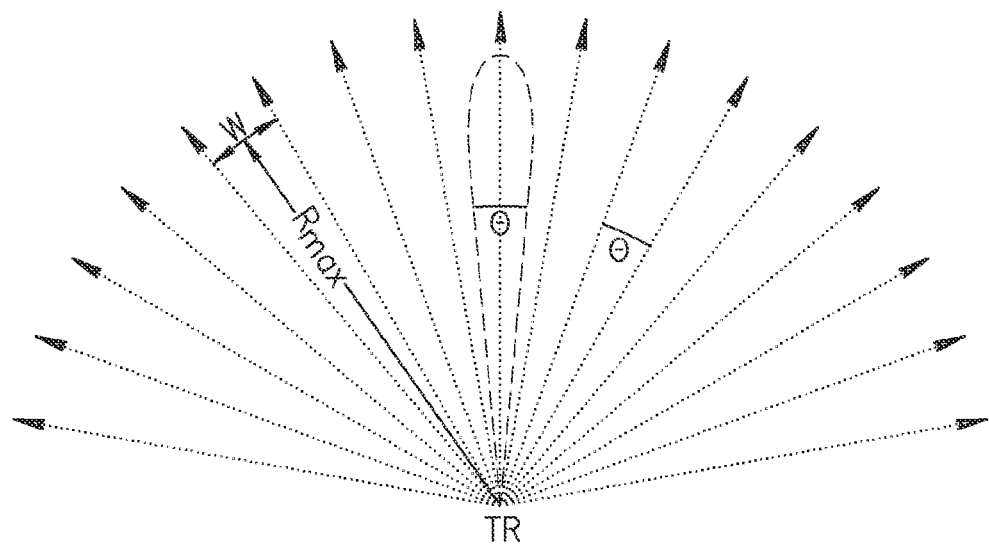
FIG. 1 shows an angularly spaced array of beams.

FIG. 1 illustrates a robotic system where a mesh of narrow-beam electromagnetic radiation is spread over a target area. The beams are equi-angularly spaced so as to effectively provide the robot with a polar co-ordinate system within the target area. As the robot moves within the target area and crosses different beams the intensity of the signal received from the beams will vary.

The system of FIG. 1 provides N infrared transmitters TR, each with a beam-width of θ; the area covered by the beams is therefore a segment of angle Nθ with a radius $R_{max}$, which is defined as W/θ, where W is the localization resolution required (for example the width of the robot payload such as the width of the cutting system in the case of a lawn-mower or the width of the brush/nozzle in the case of a vacuum cleaner). It will be understood that for the beams shown in FIG. 1, the intensity profile of each beam is not constant in the angular direction, so that a receiver moving around the transmitters at a fixed radius experiences a periodically varying infrared signal.

Optionally, each beam may be encoded in such a manner that a robot working in the target area can decode the number of the beam it is currently receiving, so that it can determine at what angle it is located at with respect to the transmitter. Where several transmitters are utilised, the beam may also be encoded with the number or other identifier for the transmitter producing the beam.

A low-cost implementation of such a mesh is possible through one or more infrared transmitters. For example, a single unit with a plurality of infrared LED transmitters, which are angularly spaced from each other, can form a polar system as shown below in FIG. 1:

However, if N is large (>10), it may be in more practical to implement the mesh of beams of FIG. 1 with a single transmitter. In this case, means for moving a part of that transmitter may be provided so that the beams may be transmitted over the area to be covered. For example a mechanically rotating system may be used. An example of such a system is shown in FIG. 2.

Figure 2:
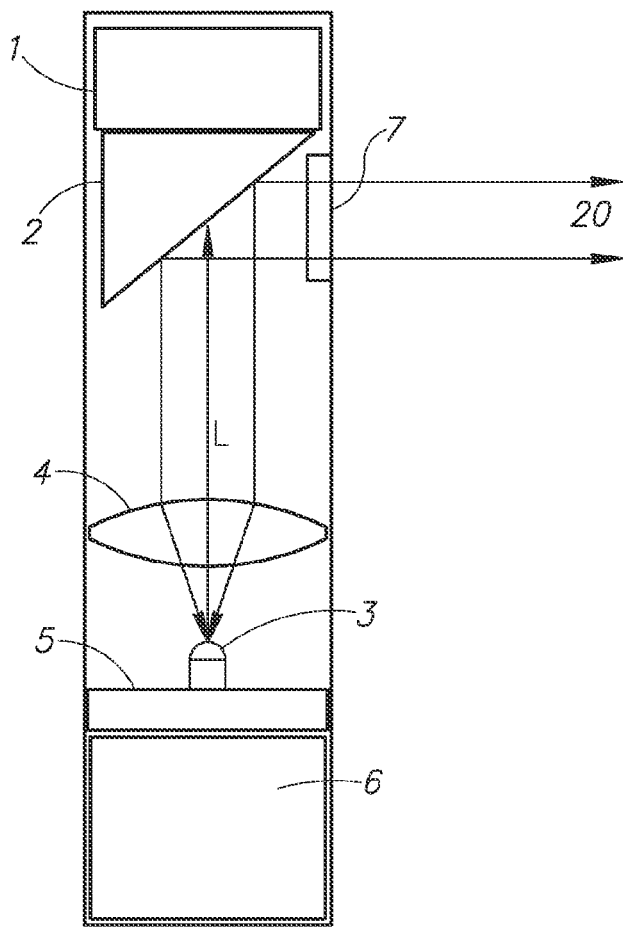
FIG. 2 displays a mechanically rotating beam operable to provide an array of beams as shown in FIG. 1.

The mechanically rotating system of FIG. 2 includes a step motor 1 attached to a mirror 2 of length h and width d. An infrared transmitter 3 (mounted on an electronic board 5 and powered by a battery 6) sends a beam 20 through a collimated lens 4 (intended to concentrate most of the energy of the transmitter) to the rotating mirror 2 which in turn directs the beam 20 through the infra-red transparent window 7 in the direction set by the step motor 1.

The beam width is defined by d/L in the horizontal direction and h/L in the vertical direction. The horizontal beam width is preferably such that it matches θ as described above, so $d/L=W/R_{max}$ (so the maximum distance from the transmitter which maintains the required resolution W is WL/d).

The skilled reader will appreciate that other arrangements are possible. For example a different motor arrangement, a different means for deflecting or reflecting the beam and/or a different IR-source arrangement may be used. In particular, it is envisaged that a mechanical arrangement for rotating the mirror is not necessary and that electromagnetic forces might instead provide for rotation and/or movement of the mirror. For example, a galvanometer mechanism might be provided to rotate the mirror.

The vertical beam width is required in some examples to be adequate to compensate for height differences between the transmitter and the robot and is defined by h/L. The control system rotates the step motor in steps separated in time by a period T.

In an optional modification of the embodiment of FIG. 2, the system may be adapted to transmit an encoded message regarding the beam currently being produced. Such an encoded message may define, for example, the transmitter number, allowing a robot to identify specific transmitters, where several are in use, and the step number, allowing the robot to identify which beam it is receiving and thus at what angular position it is located with respect to the transmitter.

Optionally, the infrared LED transmitter producing the beams may transmit such an encoded message regarding the beams during the rest period between steps. Alternatively, the message could be transmitted at a different time, for example it may be substantially simultaneous with the transmission of beam, with both signals being multiplexed, for example by modulation of the beam signal. In such a case, the receiver at the robot will be provided with a suitable de-multiplexer.

It will of course be appreciated that a source separate from the LED may be used to transmit the message. For example, a radiofrequency transmitter may be used and the message may be broadcast in multidirectionally, or omnidirectionally.

A typical encoded message can be of 13 bits (2 for the receiver Automatic Gain Control preamble, 3 bits for the transmitter number, 7 bits for the step number and 1 parity bit) and assuming 1 msec per bit, will complete a word transmission after 13 mSec. Using, for example, a step motor with a step of 2°, will result in a scan time of 1.17 sec for covering 180° (90 steps of 13 mSec). The beam in such a system should preferably be adjusted to 2° (for example using a mirror of 5 mm width and a distance of about 14 cm between the infrared transmitter and the mirror centre). If, for example, the required localization resolution required is 35 cm, it may be preferable, for the reasons given above, that the target area does not exceed 10 m from the transmitter.

A possible exemplary implementation of a rotating beam is with a DC motor that is synchronized with an infrared transmitter. The controller of the system measures the speed of the DC motor (for example with an odometer which triggers every time the motor completes a full turn) and synchronizes the infrared transmission and the motor rotation (for example either by controlling the motor speed or revising the periods of transmission of every angular direction).

Yet another exemplary implementation of the rotating beam involves the infrared transmitter transmitting the same information regardless of the beam direction, but starting the angular scan from a fixed angular position, for example upon receipt of a trigger signal either initiated by the transmitter controller or received from the robot or another external source. In this example, the robot is required to be aware of the trigger signal so that it may measure the time from the trigger time until the beam direction is received by the robot; this period of time is proportional to the angle between the robot and the transmitter initial angular position.

Figure 3:
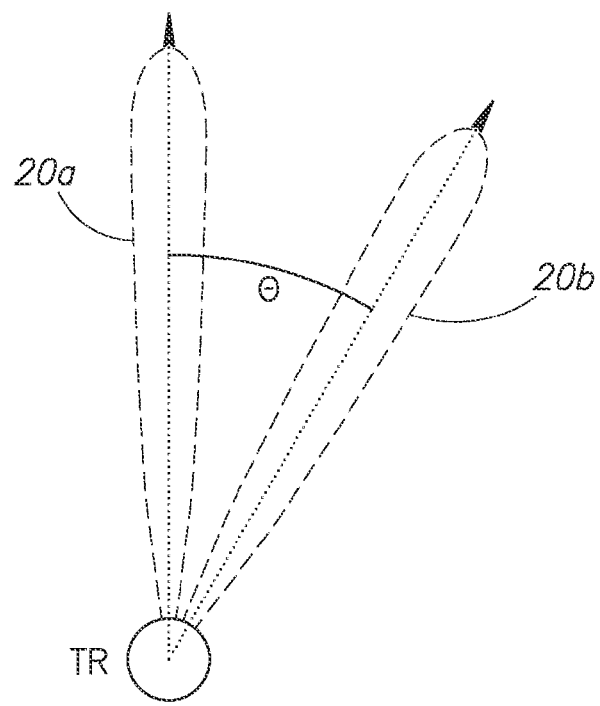
FIG. 3 illustrates the operation of the device of FIG. 2.

This example is illustrated in FIG. 3, where beam 20a is transmitted (from a transmitter TR) upon commencement of the angular scan (upon being triggered by the trigger signal) and beam 20b is transmitted at a time T after the trigger signal.

The elements of the system may be located in any appropriate way. For example some parts or elements of the system may be located on the robot or other object, or in the target area. For example, where the robot produces the trigger signal, the beam transmitter must be operably connected to a receiver for the trigger signal. Alternatively, where the trigger signal is produced by a component directly connected to the beam transmitter, the trigger signal must be broadcast or transmitted to the robot so that it may begin timing. Elements of the system may be integrated into a charging station for the robot.

In systems containing a perimeter wire carrying a signal (usually to define the designated area borders), the trigger can be sent via the wire and received both by the robot and the transmitter. It should be therefore noted that the transmitter of the radiation beam and the transmitter of the data relating to the beam need not be located in the same position. In such a situation, the data may be transmitted over a different range of the EM spectrum and may be broadcast in multiple directions or in all substantially all directions.

Simple polar beam systems as described above with reference to FIGS. 1 to 3 may be used for various robot tasks. For example, if the robot initially drives along the edges of the target area, some key points or key areas (referred to hereinafter as "key segments") on the perimeter or boundary can be identified according to the beam number intersecting with those points. Such key points can be entry points for scanning, location of a charging station, the boundary of a sub-area within the perimeter and the like.

Figure 4:
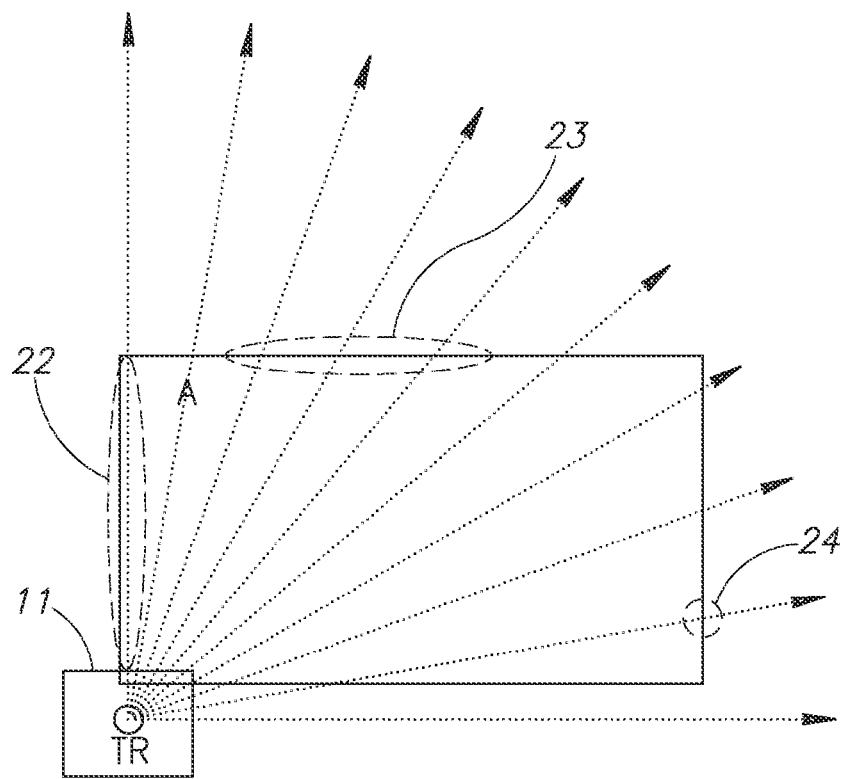
FIG. 4 shows a system for identifying areas within a perimeter for a robot.

In the example shown in FIG. 4, the transmitter (TR) is integrated into a charging station 11 and some key points and segments are defined. In particular, an elongate key segment 22 is defined in an area (A) in the vicinity of the charging station 11 along the left hand side of the perimeter. Such a key point may be utilised to guide the robot back to the charging station 11 in an efficient manner. A further long key segment 23 is defined at the rear boundary of the perimeter. Such a segment might indicate to the robot that it is required to move more slowly in this area (A), which may be advantageous if the ground is slippery and/or on a steep incline. A still further key point 24 is defined on the right hand side of the perimeter, which may indicate to the robot a preferred entry or start point from which to begin scanning the area (A).

It will be understood that the charging station may be provided at various locations: in FIG. 4, the robot is configured to move in a clockwise manner and it is therefore preferable that the charging station is provided at the left-hand side, whereas if the robot were configured to move in an anti-clockwise manner the charging station might be provided at the right-hand side.

Where the boundary or perimeter of the area (A) is demarcated by a wire, the scanning system will preferably make use of this low-voltage signal. The robot may therefore be provided with a receiver or detector that can sense when it approaches the boundary. The robot may also be provided with a receiver operable to sense when it is crossing a beam of radiation. By combining the information provided by the two receivers or detectors the robot is able to determine information relating to its current position, such as identifying when it is at the intersection of a beam with the boundary or perimeter.

The polar system can also be used for scanning the designated area. For example, the robot or other object may ride a specific beam. In examples, the robot will therefore move in the area until it identifies a beam and then will move to follow the beam. In some arrangements, the robot can correct to the left or right if receiving the neighbouring beam. The robot preferably continues to follow the beam until the perimeter of the area is reached, whereupon the robot will drive along the perimeter until acquiring the next beam to ride on.

While the beams shown in FIG. 4 are equi-angularly spaced, it will be appreciated that this is not a requirement for a working system. Optionally, the beams may have irregular angular spacing so as to provide better angular resolution in areas further away from the transmitter. For example, if it is assumed that the system is to be utilised in a generally square or rectangular area, and that the transmitter is to be placed within or near a corner of the area, it may be advantageous for the beams to have a greater concentration in one direction, so that this may be aligned to face the diagonally opposing corner of the area where the robot will be furthest from the transmitter. In such a situation, the transmitter may preferably communicate data relating to the spacing of the beams to the robot.

Figure 5:
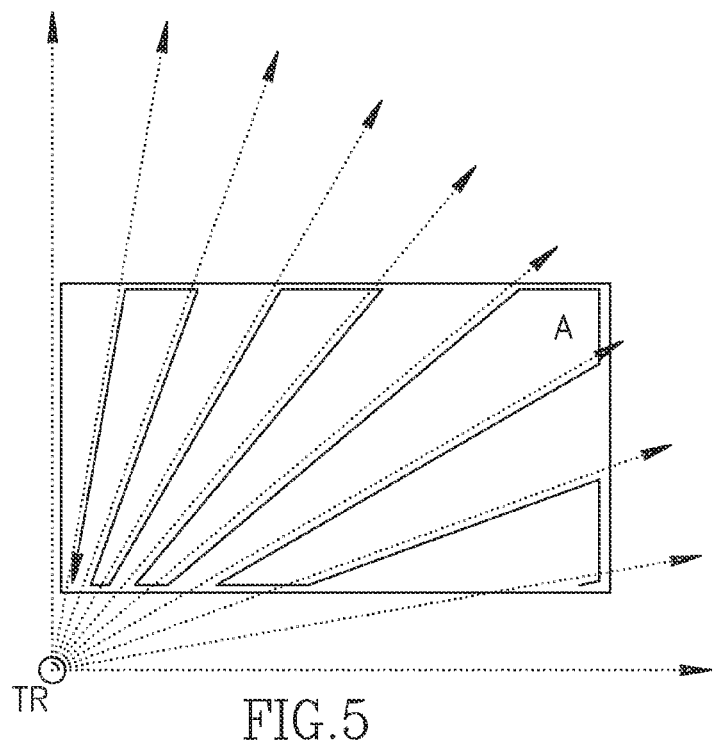
FIG. 5 illustrates a scanning pattern by which an area may be traversed by a robot.

FIG. 5 shows such a scanning pattern (the solid black line indicates the path of the robot). It will be appreciated that the coverage efficiency of such a scan depends on the density of the beams. For example, if the transmitter is located at one of the corners in a manner that all beams intersect in that corner, and the maximum beam spacing matches the payload width, than the efficiency of a rectangle coverage is about 50% of maximum (since the robot will converge to the transmitter at every beam and will overlap pervious beam rides). Nevertheless, if the transmitter is located outside the target area the efficiency can be improved substantially (the efficiency is approximately 50%+50%/(1+L/k) where k is the distance from the transmitter to the target area and L is the square root of the area. Note that the efficiency of a random area scanning pattern is about 20% of maximum for a 98% coverage of the total area.

According to the present invention, the location of the robot within the work area (A) can be estimated using a combination of beams and means for measuring the distance that the robot has traveled (for example using the robot odometer). In the most straightforward examples, the robot may simply count the number of revolutions that one or more of its wheels undergo during movement across the path of two or more beams. Optionally, the received beam numbers may also be utilised so that the robot may immediately determine at approximately what angle it is located with respect to the transmitter.

Figure 6A:
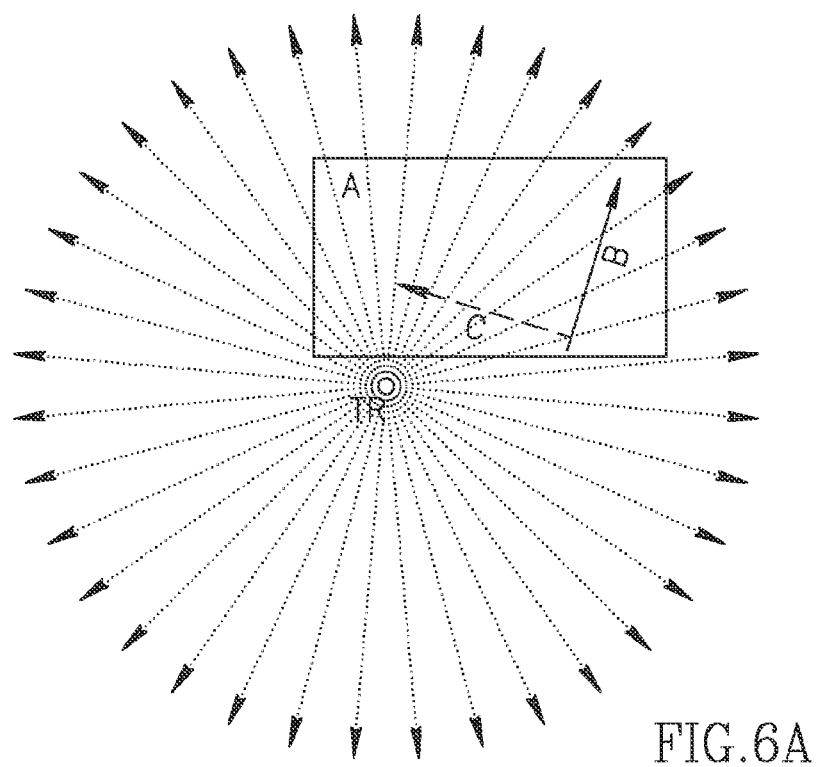
FIG. 6 displays a system where a robot may locate the position of a transmitter using an array of beams such as that shown in FIG. 1.

FIG. 6A shows an example of such a system, where a robot traverses an area A that is covered by an equi-angularly spaced array of beams produced by transmitter TR. The transmitter TR may have a construction similar to that depicted in FIG. 2, may use of a rotating mirror. Alternatively, an array of separate transmitters may be utilised, each of which produces one of the beams shown in FIG. 6A.

Figure 6B:
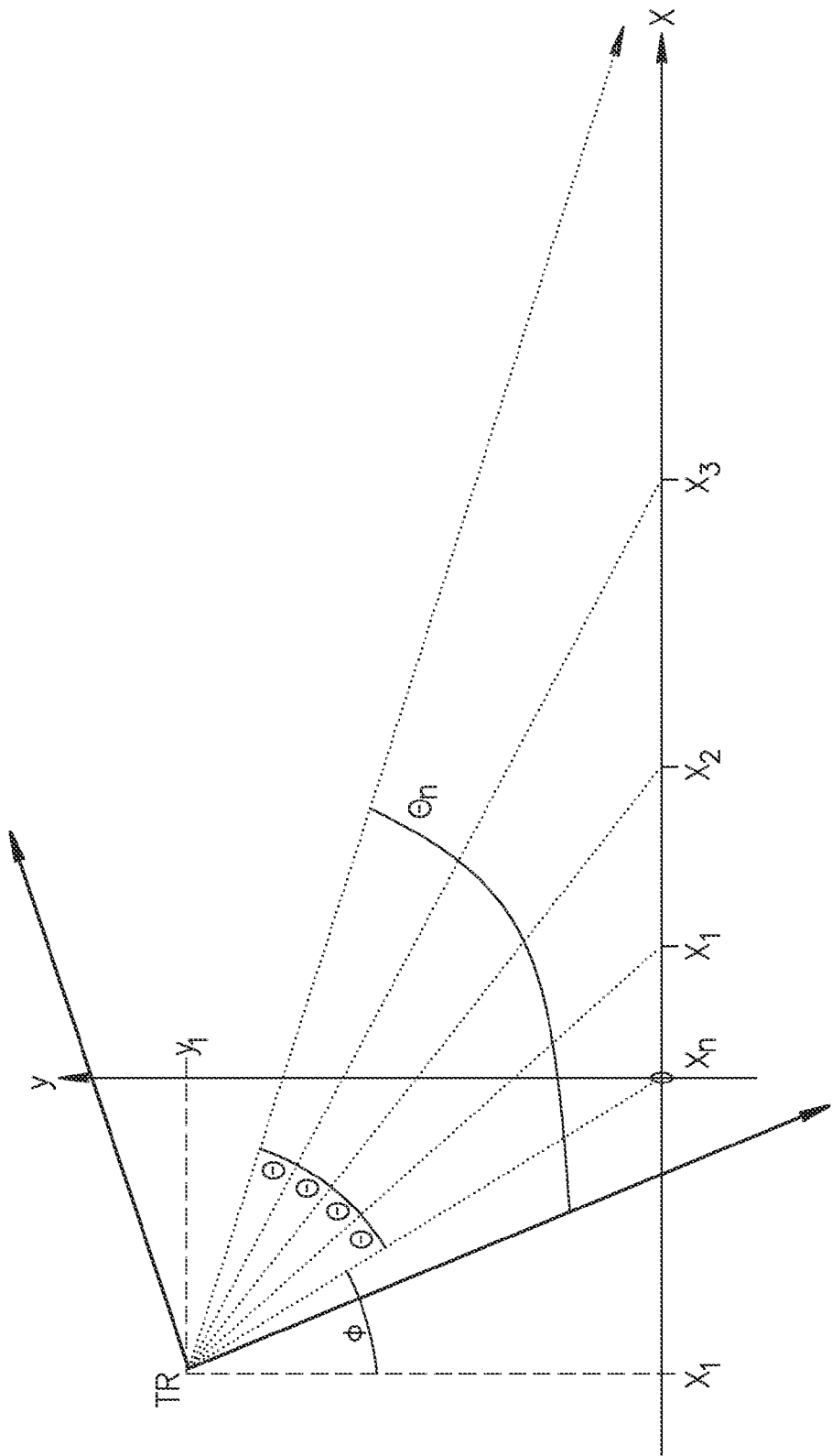

In FIG. 6A, the robot is shown travelling in a straight line along the solid vector B; a Cartesian axis system may thus be defined so that the robot travel vector is the x-axis as shown in FIG. 6B and hence the dashed line C, perpendicular to the travel vector B, is defined as the y axis, as shown in FIG. 6B.

In this Cartesian axis system, the point $(x_t, y_t)$ is the location of the transmitter (currently unknown), $x_1$-$x_n$ are the distances from the origin where the robot receives the different beams, as obtain from the robot odometer, and $\theta$ is the angle between every two neighbouring beams.

From FIG. 6B it is possible to deduce that:

$$\tan(\phi + n\theta) = \frac{x_n - x_t}{y_t} \qquad (1)$$

Where n is the number of beams crossed during the travel vector. It is further possible to deduce that:

$$\tan\phi = \frac{x_0 - x_t}{y_t} \qquad (2)$$

Thus, using the following identity:

$$\tan(\phi + n\theta) = \frac{\tan\phi + \tan(n\theta)}{1 - \tan\phi\tan(n\theta)} \qquad (3)$$

And defining $k_n = \tan(n\theta)$ and $x_0$ as 0, equation (1) reduces to:

$$\frac{y_t/x_t + k_n}{1 - y_t k_n/x_t} = \frac{y_t}{x_t - x_n} \qquad (4)$$

Equation (4) may then be rearranged in the following form:

$$\left(x_t - \frac{x_n}{2}\right)^2 + \left(y_t - \frac{x_n}{2k_n}\right)^2 = \frac{1}{4}x_n^2\left(1 - \frac{1}{k_n^2}\right) \qquad (5)$$

Which describes a circle with all the possible locations of $x_0$, $y_0$ that satisfy the condition of $\theta$. The exact values of $x_t$, $y_t$ can be obtained if n=2 (two equations with 2 unknowns $x_t$ and $y_t$) but since the values of $x_n$ are subjected to errors due to the odometer accuracy, accuracy in the spacing of the beams, and other factors, a better estimation of $x_t$, $y_t$ in some examples can be obtained using regression or other mathematical methods and the larger that n is, the more accurate are the estimations.

It may therefore be preferable for the robot to initially travel along a straight line intersecting a plurality of the beams until the variation in successive estimates of the transmitter's location, and thus the estimated error in the transmitter's location, is reduced below an acceptable limit.

Optionally, the robot may scan the area using an algorithm that is designed to improve the accuracy of the estimate of the transmitter's position. This may involve travelling along a straight line through the intersection of three beams and then, turning the robot to travel along a further straight line, the angle of the turn depending on whether the distance between intersections is increasing or decreasing.

Looking now at the transmitter Cartesian coordination system where the origin is the transmitter location and the X axis is at the direction where the scanning beam starts, then assuming the distance between the transmitter and the respective point of travel on the robot travel vector:

$$D_n = \sqrt{((x_n - x_t)^2 + y_t^2)} \qquad (6)$$

Than the location of the robot at point Xn, Yn can be expressed in the transmitter coordination system as:

$$x_n = D_n \cos(\theta_n) \qquad (7)$$

$$Y_n = D_n \sin(\theta_n) \qquad (8)$$

Where $\theta_n$ is the respective angle of the scanning beam.

Beside the robot location estimation, it is also possible to determine whether the robot is driving towards or away from the transmitter, by comparing the segments $D_n = x_{n+1} - x_n$ (the distance traveled between sequential beams). If $D_n$ are increasing, than the robot is driving away from the transmitter, where if $D_n$ are decreasing, then the robot is driving towards the transmitter.

If the system is operable to transmit information relating to the beams such that the robot is able to identify the beam it is currently in the vicinity of, it may be possible for the beams to be spaced in a non-regular manner, provided that the angles between the beams are known to the robot.

Although it is preferred that the beams are encoded with data identifying the particular beam and, optionally, the transmitter that provided the beam, or that this data is transmitted to the robot in another manner, this is not essential. It is, of course, possible for the robot to simply sense beam crossings by the variations in intensity of the signals received at the robot. However, since it may be difficult for the robot to differentiate between reduction in the intensity of the signal due to the presence of an obstacle and reduction in intensity due to the robot moving away from the beam, some means, such as those listed above, by which the robot can differentiate between the beams may be preferable.

Additionally, the system described above may be adapted to operate with a beam transmitter that provides a two-dimensional array of beams. In such a system, the array of beams may define a Cartesian system of co-ordinates. In this case it may be particularly preferable to transmit information relating to the individual beams. Where the robot is intended for use within the household, such a transmitter may conveniently be located on the ceiling.

The localization of the robot can be used in examples for various tasks, such as identifying points of interest (vicinity to the charging station, entry points and/or sub-area separation for example), scanning (the robot can mark every place it has visited and plan how to optimize the scanning of the area) and definition of the work area (the robot can be taught the area it should work in, and follow that boundaries during the operation).

The function of identifying points of interest is preferably performed where data relating to each beam is transmitted to the robot. Assuming that the transmitter TR is not moved, this allows the robot to identify a point of interest even if it leaves and re-enters the working area (A).

Figure 7:
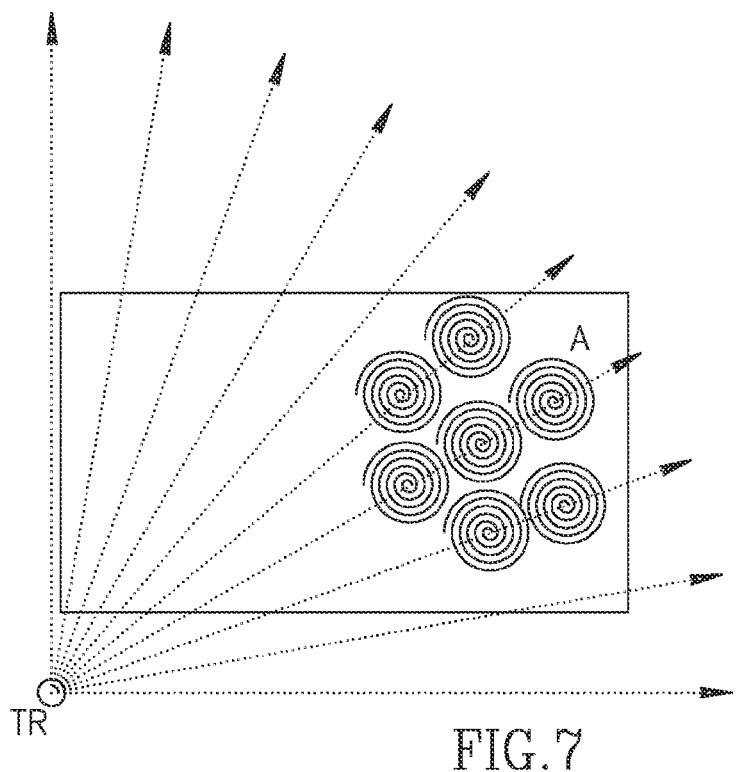
FIG. 7 illustrates a further scanning pattern by which an area may be traversed by a robot.

FIG. 7 shows a scanning pattern based on spirals. The spiral is a local pattern which is based on odometer readings only, and is reasonably accurate owing to its relatively short overall travel length. Such a pattern allows the robot working width to be matched with the resolution that can be obtained from the localization system described above. The scanning pattern of FIG. 7 is composed of multiple spirals, each centred on a point intersected by a beam. The robot estimates the centre location for each spiral using the methods described above and marks that area (in the size of the spiral) as "covered". In this way the robot can create a map of covered and uncovered areas and can complete the scanning accordingly, reaching an overall efficiency depending on the overlap between the spirals and the localization accuracy.

It will of course be understood that other scanning patterns could be used instead of the spiral, such as simple circular loops, figure-of-eight loops and the like.

Figure 8:
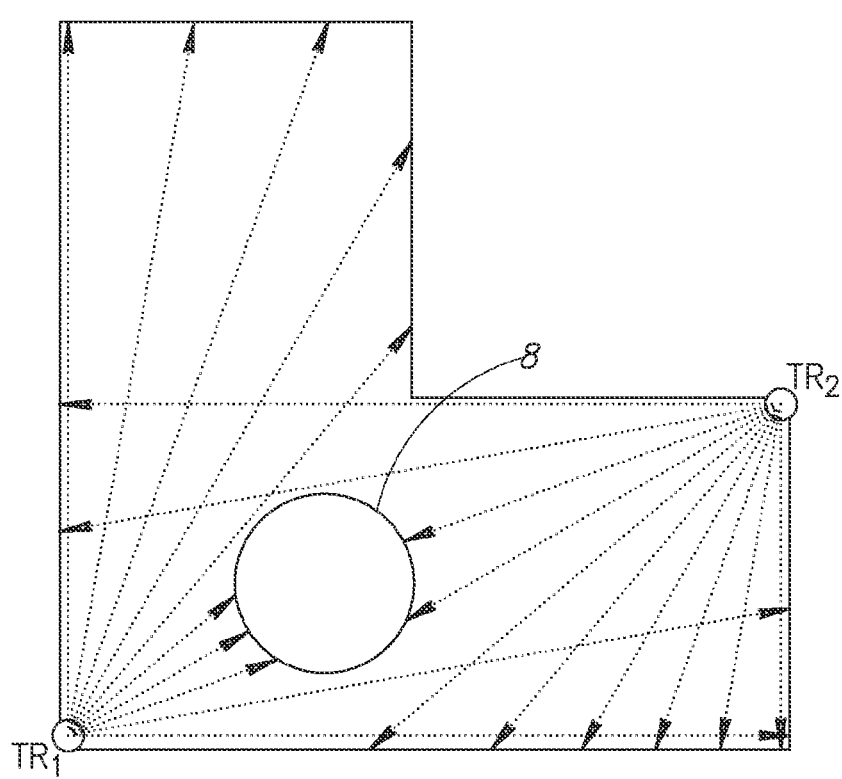
FIG. 8 displays a localisation system utilising two transmitters to overcome an obstruction within an area.

As noted above, in some examples, information can be encoded into the transmitted beams. This information can include information regarding the transmitter from which the beam was emitted, for example the transmitter unique number. In some examples, the robot can work with multiple transmitters simultaneously. This is useful in improving the localization accuracy (the robot can estimate its location in relation to each transmitter $TR_1$, $TR_2$, and further improve the accuracy of its estimated position by weighting the data from each system), but moreover allows better coverage of the target area with beams, so as to take account of areas having complex perimeter shapes and obstacles 8 that create "shaded" areas, as shown in FIG. 8. The accuracy of the localization in the systems previously described can be further improved in some examples by measuring the distance between the transmitter and the robot (thus obtaining an angle and a radius in the polar system hence defining an absolute location of the robot).

The distance information is preferably required at the robot (although it can be obtained at the transmitter or elsewhere and than communicated to the robot). A simple low-cost solution is to transmit an omni-(or large angle) directional ultrasound (for example between 35 khz and 60 Khz) pulse synchronized with the beam transmission, for example infrared transmission. The robot will preferably measure the time between the infrared pulse and the time the ultrasound signal is received and will calculate the distance based on the sound velocity (300 m/Sec).

Since the target work area may be large, the ultrasound pulses preferably are time-spaced in a manner that will allow one pulse to reach the receiver before the next pulse is transmitted. For example, if the maximum distance possible between the robot and the transmitter $TR_1$, $TR_2$ is 30 m, the pulses are preferably at least 100 mSec spaced to avoid ambiguity. Such a pulse rate may be slower than the required infrared, however it may be still synchronized with the infrared transmission since the infrared transmission also can carry information about the beam number.

Figure 9:
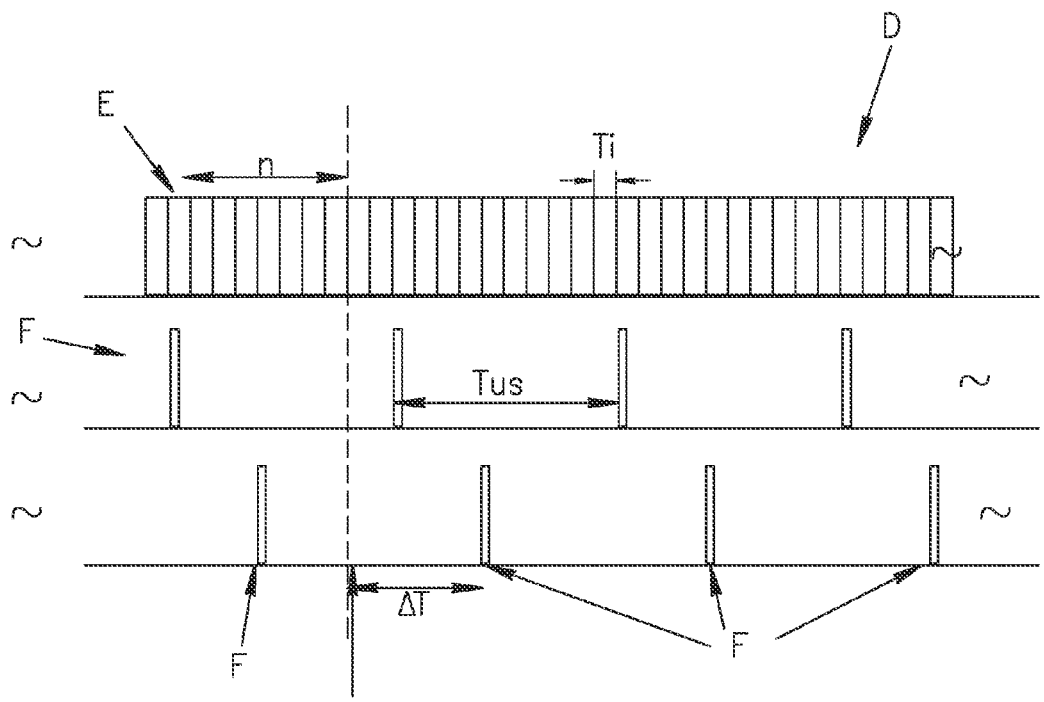
FIG. 9 illustrates a system for measuring the distance between a robot and a transmitter.

In the example shown in FIG. 9, the first set of pulses (D) represent the infrared transmissions (only a slice of the transmission scan is showing). Each pulse represents a single transmission (for example of length 10 mSec) which carry information, for example about the transmitter number and/or the beam number. The pulse E indicates the first beam (0) and the next pulses are numbered 1, 2, 3 and so on until the last pulse and than back to 0.

The second set of pulses (F) represents the ultrasound pulses (for example of length 1 msec, every 100 msec). The ultrasound pulse is synchronized with the infrared transmission so that whenever an ultrasound pulse is sent, it starts together with the infrared transmission.

The third set of pulses represents the pulses received by the robot. While the ultrasound (F) pulses are potentially all received at the same time (since they are transmitted omni-directionally), in this example there is only one infrared pulse G received by the robot, on every transmitter sweep, which relates to the direction the robot is located in relation to the transmitter (the transmitter scans all target directions sequentially as previously described). Such a pulse can be obtained, for example, every 1 sec, if the transmitter scans about 100° degrees with a beam width of 1°, and a transmission of 10 mSec per direction).

In this example, the robot measures the time between the start time of the received infrared transmission and the next received ultrasound pulse. The distance from the transmitter is:

$$(\Delta T + n*Ti)*Vs \qquad (9)$$

Where
$\Delta T$ is the time between the infrared transmission start and the received ultrasound pulse.
Ti is the infrared transmission (10 mSec in this example),
n is the number of the transmitted beam (as counted from the initial angular position of the transmitter illustrated by the blue pulse)
Vs is the speed of sound (300 m/Sec)

The next received ultrasound pulses can be also interpreted based on their time from the infrared transmission, knowing the interval between transmitted pulses Tus:

The distance based on the m pulse (where the first pulse calculated above is pulse m=0) can be obtained by:

$$(\Delta T - m*Tus + n*Ti)*Vs \qquad (10)$$

The robot's infrared and/or ultrasound receivers can be omni-directional in order to receive the transmissions at any robot orientation. However, an omni-directional receiver could be composed of several receivers for example covering together all directions. In such implementations, once an infrared transmission is received from a certain direction, the robot preferably opens only the ultrasound receiver aiming to that direction, thus improving the signal to noise and filtering possible noises from other directions.

It is also possible in some examples to synchronize the ultrasound system with an external source. For example, if the robot is using a perimeter wire with an electro-magnetic signal as a boundary of the designated work area, that signal can send synchronization pulses (for example, by stopping the perimeter wire transmission for 1 mSec every 100 mSec) to be received both by the robot and the transmitter so that the ultrasound pulse will be transmitted upon a synchronization pulse and the robot will measure the time between the synchronization pulse and the received ultrasound Since in some examples, the robot operates at the target area only for limited periods (usually because it needs to recharge or because task has been completed), it is desired that the transmitter described previously will operate only on that periods, thus saving energy and electrical components life-time.

Figure 10:
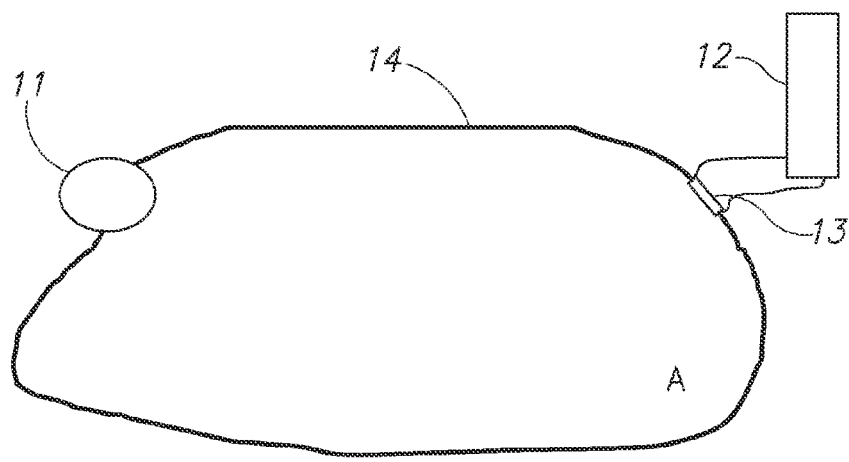
FIG. 10 shows a system operable to initialize a transmitter such as that shown in FIG. 2.

There a several ways of initializing or triggering the transmitter operation:

If a perimeter wire system is installed (around work area A), and is active only when the robot is running, the transmitter control unit 12 can be connected to the perimeter wire 14 and initialize operation once the perimeter wire 14 carries a signal. Preferably the trigger can be obtained either by sensing the electromagnetic field of the perimeter wire 14 or by a direct connection to a resistor, such as a shunt resistor 13, which may for example be connected serially to the perimeter wire as shown in FIG. 10.

The transmitter can initialize operation upon detecting a signal, for example a radio frequency (RF) signal, for example transmitted by the robot or the charging station 11 of the robot, upon robot operation start. In examples, the transmitter will then run for example for a pre-set period of time or until another RF trigger will be received.

The controller of the transmitter can preferably be extended to include scheduling so that it is programmed to operate in certain times at certain days of the week. Since such a programming is usually done also to the robot or the charging station, those can be omitted and the robot can initialize operation upon sensing the transmitter either infrared or ultrasound transmissions.

There has been described above with reference to FIG. 5 a polar scanning method that is based on 'beam riding" (where the robot follows the path of a beam) that may increase scanning efficiency.

In addition, using a distance measurement such as described above, and/or multiple transmitters, can further improve scanning efficiency.

With the knowledge of distance, the robot can ride, for example, on only the odd beams if the distance of the robot from the transmitter is smaller than $W/2\theta$ (W is the localization resolution as discussed with respect to FIG. 1, which is usually the robot payload work width). Thus in some examples, the robot's movement will be dependent on its distance from the transmitter(s).

Figure 11:
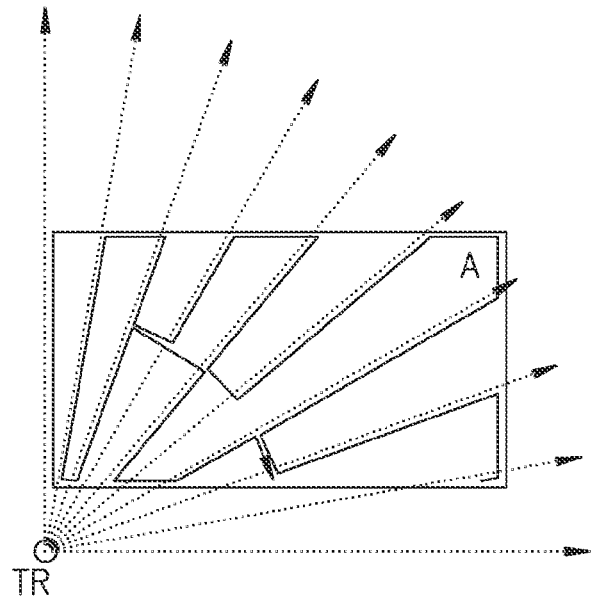
FIG. 11 illustrates a still further scanning pattern by which an area may be traversed by a robot, utilising two transmitters.

FIG. 11 shows a sample scanning pattern in which the robot rides on all beams when it is at a distance greater than $W/2\theta$ from the transmitter and only on the odd (or even) beams if it is closer. The efficiency of such a scan is higher than 50%.

With multiple transmitters, the scanning efficiency can be further improved, for example by choosing to ride on only beams having a particular orientation, for example those which are parallel.

Figure 12:
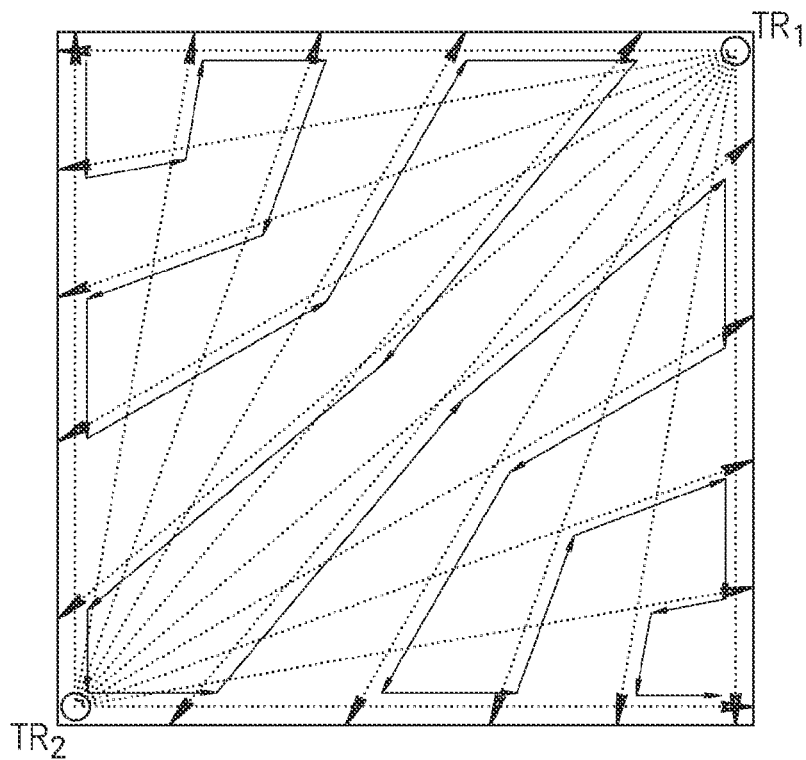
FIG. 12 illustrates yet a further scanning pattern by which an area may be traversed by a robot, utilising two transmitters.

A further example of a scanning algorithm for transmitters located on the corners of the diagonal of the target area is shown in FIG. 12. The basic algorithm is to travel on the perimeter until crossing a beam from the first transmitter $TR_1$, ride on the beam towards the first transmitter $TR_1$ until crossing a beam from the second transmitter $TR_2$. The robot then continues riding on the beam from the second transmitter away from the second transmitter until it reaches the perimeter, whereupon it then follows the perimeter to the next intersection with a beam from the second transmitter, riding that beam towards the second transmitter until crossing a beam from the first transmitter which has not yet been visited, and continues riding that beam towards the perimeter. Upon reaching the perimeter, it follows the perimeter until it crosses the next beam from the first transmitter, whereupon the above series of steps is repeated until the area has been covered.

An advanced (efficient) scanning can also be planned using other techniques, for example by travelling the perimeter first and registering all the intersections with the beam, thus creating an estimated map of the transmitters' locations, and/or obstructions of obstacles and the like.

The above features were described based on an encoded infrared scanning beam, but can be generalized to any source of radiation, for example that can be encoded and transmitted through a directional beam. Practical wavelengths would generally be at a range which is much less than the desired resolution W (due to diffraction limits). For example, the beam can consist of electro-magnetic radiation in the range of microwaves, for example transmitted through a rotating directional antenna or a phase-array which shape change the transmitted beam angle by means of controlling the phase of the wave in every element of the antenna. The directional transmission can be also in the ultrasound range, thus enabling a distance and direction measurement on the same transmission (for example with an external synchronization system such as the perimeter wire, as described above).

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A robotic system comprising:
    a beam transmitter operable to emit a plurality of angularly-spaced beams of radiation in an area;
    a robot operable to move within said area and to detect when it is in the path of one of said beams;
    a reference transmitter operable to transmit a reference signal;
    a timer, mounted on said robot, configured to commence timing upon transmission of said reference signal;
    a pressure wave transmitter provided adjacent said beam transmitter, configured to transmit a pressure wave to said robot upon transmission of said reference signal, and
    a receiver, mounted on said robot, operable to receive said pressure wave;
    wherein said robot is further operable, upon moving through a distance across the paths of two or more of said beams, to determine the relative position of said beam transmitter and said robot by using information relating to said distance and information relating to the spacing of said beams, and
    wherein said timer is operable to determine a time interval between the transmission of the reference signal and the receipt of the pressure wave and using the determined time interval to determine information regarding the position of the robot relative to the beam transmitter.

2. The system of claim 1, wherein said beams are equi-angularly spaced.

3. The system of claim 1, wherein said robot, in order to identify said position, moves in a substantially straight line crossing the paths of two or more beams.

4. The system of claim 3, wherein said robot utilises the distance travelled between crossing the paths of two different beams to determine said position.

5. The system of claim 3, wherein said robot continues to travel along said straight line until the position of the beam transmitter is known within a pre-determined level of accuracy.

6. The system of claim 5, wherein said robot comprises an odometer.

7. The system of claim 1, wherein said robot utilises the distance travelled between successive crossings of the paths of said beams to determine whether it is moving towards or away from said beam transmitter.

8. The system of claim 1, wherein the reference signal includes an electromagnetic wave.

9. The system of claim 1, further comprising a data transmitter operable to transmit data relating to each of the beams of the array.

10. The system of claim 8, wherein the pressure wave includes an ultrasonic wave.

* * * * *